Nov. 4, 1969        E. PLESS        3,476,894
DEVICE FOR INDICATING A PREDETERMINED PORTION OF A
TAPE COIL AND TAPE-WINDING APPARATUS
INCORPORATING SUCH DEVICE

Filed Oct. 11, 1967        3 Sheets-Sheet 1

INVENTOR
ERNST PLESS
BY
*Marlfleur and Toren*
ATTORNEYS

Nov. 4, 1969　　　　　　　　E. PLESS　　　　　　　3,476,894
DEVICE FOR INDICATING A PREDETERMINED PORTION OF A
TAPE COIL AND TAPE-WINDING APPARATUS
INCORPORATING SUCH DEVICE
Filed Oct. 11, 1967　　　　　　　　　　　　3 Sheets-Sheet 2
FIG.4a　　FIG.4b　　FIG.4c
  
FIG. 5
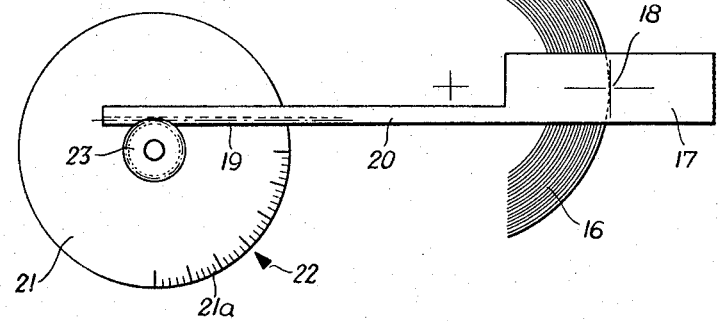
FIG.6a
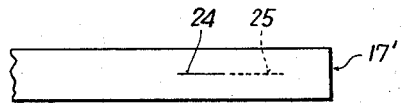
FIG.6b
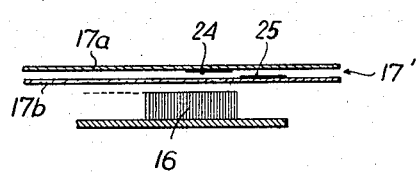
FIG.7
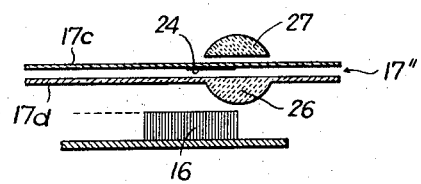
INVENTOR
ERNST PLESS
BY
ATTORNEYS Nov. 4, 1969   E. PLESS   3,476,894
DEVICE FOR INDICATING A PREDETERMINED PORTION OF A
TAPE COIL AND TAPE-WINDING APPARATUS
INCORPORATING SUCH DEVICE Filed Oct. 11, 1967   3 Sheets-Sheet 3

INVENTOR
ERNST PLESS
BY
ATTORNEYS

United States Patent Office 3,476,894
Patented Nov. 4, 1969

3,476,894
DEVICE FOR INDICATING A PREDETER-
MINED PORTION OF A TAPE COIL AND
TAPE-WINDING APPARATUS INCORPO-
RATING SUCH DEVICE
Ernst Pless, Maxingstrasse 30, Vienna, Austria
Filed Oct. 11, 1967, Ser. No. 674,492
Claims priority, application Austria, Oct. 18, 1966,
A 9,716/66; Jan. 27, 1967, A 799/67
Int. Cl. G11b *15/32;* G01f *3/10*
U.S. Cl. 242—200      19 Claims

ABSTRACT OF THE DISCLOSURE

A device for indicating a predetermined portion of a tape coil, wound on a reel, disk, or the like, includes a pointer guide arranged to extend across the periphery of a wound tape coil in a plane which is substantially normal to the axis of the tape coil. A manually operable reading pointer is mounted on the guide for movement along the same free of contact with the tape coil. This pointer has a reading mark movable by the pointer into registry, with the periphery of the tape coil, parallel to the axis thereof. An indicating device is provided for indicating the position of the pointer, and connected by suitable transmission means to the pointer.

There is also disclosed tape-winding apparatus incorporating the indicating device.

BACKGROUND OF THE INVENTION

Information recording and reproducing apparatus utilizing an insertable record carrier in the form of a wound coil of tape or film, such as, for example, magnetic tape recorders, motion picture apparatus, and the like, are generally provided with means for measuring and indicating the extent to which the record carrier has been unwound. The measuring and indicating means or devices not only furnish information on the extent to which the recording medium has been unwound but serve also for indicating predetermined portions of the recording medium so as to make available predetermined information.

The measuring and indicating devices generally used comprise counting mechanisms or scale-pointer systems, and are generally driven by the means for driving the recording medium, such as the tape coil. For example, the measuring and indicating devices may be driven by a frictional belt drive coupled to the shaft of the take-up reel. At the beginning of any new recording on the tape or film, the measuring and indicating device must be set to zero. When the indicated values have been noted, desired portions of the record on the tape or film can be found easily at a later time.

It may be stated, somewhat parenthetically, that tape recorders, for example, are used primarily by technically unskilled people who expect the apparatus to have a reasonable price and to be simple in operation. In such cases found in practice, there is no requirement for a particularly high accuracy of the measurement, and it is sufficient if the desired tape portion to be found is indicated roughly, because the exact point where the new recording begins will be acoustically determined while the record on the tape is being played back.

Known devices for measuring coils of tape or film comprise measuring scales which may be applied to the coil of tape or film or which are in a fixed position relative thereto. These measuring scales may be provided with a vernier. While such devices afford a sufficiently high accuracy of measurement, the reading of a measuring scale, or the adjustment of a vernier device, involve some effort whereas the average user of a tape recorder wants to obtain the desired information at a glance and without need for complicated measurements.

There are also known measuring devices for coils of tape or film in which a feeler contacts the circumference of the coil and the change in position of the feeler, in response to change of the circumference or radius of the coil, is used as a measure or indication of the extent to which the recording medium has been unwound. Such devices have disadvantages in that they impose a load on the driving means for the tape recorder, and obstruct changing of the tape coil. Additionally, they require a zero resetting operation upon a change of the tape coil and it is difficult, if not impossible, to incorporate these devices into existing apparatus.

Cartridge-type tape recorders, reproducers and recorder-reproducers comprise a cartridge-receiving space which is adapted to be closed by a cover and into which stub shafts, for driving the tape coils, protrude. As compared to normal tape recorders, reproducers and recorder-reproducers, which require exchange of reels, the cartridge-type devices are distinguished in that the tape has been wound up in a cartridge and can be inserted into or removed from the recorder, reproducer, or recorder-reproducer irrespective of the extent to which the tape in the cartridge has been unwound. With normal recorders, reproducers and recorder-reproducers, it is possible to insert or remove only the completely wound tape coil. On the other hand, with these normal devices, the length of the unwound tape can be measured and a predetermined tape portion can be localized by a counting mechanism or the like. Cartridge-type tape recorders, reproducers, or recorder-reproducers lack this advantage because a counting mechanism would make no sense as the cartridges can be removed at any time irrespective of the extent to which the tape has been unwound. While the cartridges have windows through which the tape coils can be observed, such observation provides only a rough indication of the length of tape which has been unwound, and a precise location of predetermined portions of the tape cannot be made by such observation.

SUMMARY OF THE INVENTION

This invention relates to information recording and reproducing apparatus utilizing a recording medium, such as a tape or film, wound in a coil. More particularly, the invention is directed to a novel and simplified device for indicating a predetermined portion of wound recording medium and to a recording medium winding apparatus incorporating such device.

The measuring and indicating device of the invention may be compared, with some approximation, to the mentioned coil measuring devices in which a feeler contects the circumference of the coil. However, the invention device has several advantages compared to the feeler type device and also to the other measuring and indicating devices mentioned above. For example, the invention measuring and indicating device does not impose a load on the means for driving the tape recorder or the like and does not obstruct change of a tape coil. Also, it eliminates the need for a zero resitting operation upon a change of the tape coil, and it can be designed in such a manner that it can be incorporated into existing apparatus. In accordance with the invention, a device for indicating a predetermined portion of a recording medium coil is provided in which a contact-free measurement of the radial thickness of the coil may be obtained by a strictly visual reading. The device comprises a pointer which is mounted for movement in a plane that is substantially normal to the axis of the recording medium coil, and which is provided with a reading mark which is adjustable to a position in which it is in registry with the circumference of the coil. This pointer is arranged to be displayed by direct or indirect manual actuation, and an indicating device is provided and is connected by a suitable transmission means to the pointer to provide a direct or indirect reading of the position assumed by the pointer in response to the adjustment of the reading mark into registry with the circumference of the recording medium coil.

The position of the pointer, or its reading mark, relative to the coil can be clearly determined on the indicating device, and corresponds to a predetermined portion of the record. The association between the indicating device and the coil is effected only by the line of sight of the viewer's eye, so that the indicating device cannot influence the coil. During the recording of the information which is to be thereafter selected, the reading pointer is visually adjusted to the circumference of the coil and the indicated value is noted. Before the desired information is played back, the noted position is re-established and the recording medium is unwound to such an extent, suitably at high speed, that the reading mark is again in registry with the circumference of the coil. At this time, the desired information has been reached on the recording medium. The indicating scale may bear indicia which relates to length units of the recording medium, such as a tape or film, so that the lengths of the recording medium can also be measured.

The invention is also directed to the use of the measuring or indicating device just mentioned for indicating a predetermined portion of a wound up tape in a cartridge-type recorder, reproducer, or recorder-reproducer, and which includes a cartridge-receiving space which is adapted to be closed by a cover and into which project stub shafts for driving the tape coils.

Accordingly, an object of the invention is to provide an extremely simple indicating means or device for use with wound coils of recording medium, such as tape or film.

Another object of the invention is to provide such a device which facilitates the noting and indications of desired portions of a record on a recording medium.

A further object of the invention is to provide such a device which, under certain circumstances, also provides an indication of the length of recording medium which has been unwound.

Still another object of the invention is to provide such a device which can be incorporated easily into existing apparatus.

A further object of the invention is to provide such a device which is readily usable by technically unskilled people.

Yet, another object of the invention is to provide such an indicating and measuring device which does not impose any load on the means for driving a tape recorder and does not obstruct changing of the tape coil.

A further object of the invention is to provide such a measuring and indicating device which eliminates the need for a zero resetting operation upon a change of a tape coil.

Another object of the invention is to provide a cartridge-type tape recorder incorporating the aforementioned measuring and indicating device.

BRIEF DESCRIPTION OF THE DRAWINGS

For an understanding of the principles of the invention, reference is made to the following description of typical embodiments thereof as illustrated in the accompanying drawings.

In the drawings:

FIGS. 4a, 4b and 4c are views of the end faces of tape-driving stub shafts designed according to the invention;

FIG. 5 is a top plan view illustrating one form of transmission means interconnecting the pointer and indicating device in accordance with the invention;

FIG. 6a is a partial plan view of one form of reading pointer embodying the invention;

FIG. 6b is a partial longitudinal sectional view of the reading pointer shown in FIG. 5;

FIG. 7 is a view, similar to FIG. 6b, illustrating another embodiment of the reading pointer of the invention;

DESCRIPTION OF THE PREFERRED EMBODIMENTS

Figure 1:
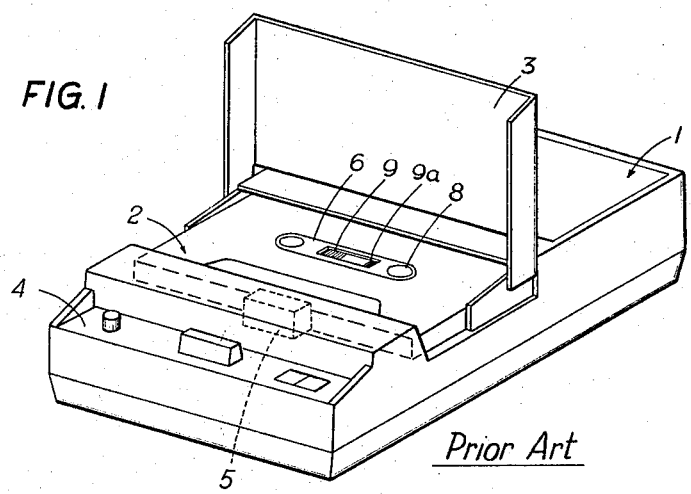
FIG. 1 is a somewhat diagrammatic view of a cartridge tape recorder of a commercially available type.

For a better understanding of the invention, a cartridge tape recorder, of commercially available type, will first be described briefly with reference to FIG. 1. FIG. 1 is essentially a diagrammatic view of the cartridge tape recorder and illustrates only the structure essential for an understanding of the present invention. As shown, this cartridge tape recorder comprises a flat prismatic housing 1 containing the usual components, such as tape-driving means, amplifiers and the like, and which is recessed in its upper surface to form the so-called cartridge-receiving space 2 which can be closed by a pivoted or fitted cover 3. The various controls for the tape recorder are disposed forwardly of the cartridge-receiving space 2, and are generally indicated at 4. These controls are not essential for an understanding of the invention. Sound heads or transducers 5 are disposed on the forward end wall of cartridge-receiving space 2, and likewise are insignificant with respect to the present invention.

Stub shafts for driving the tape protrude upwardly from the bottom of the cartridge-receiving space 2. A cartridge 6, containing the tape coil, is fitted in a known manner on these stub shafts. Also in a known manner, cartridge 6 has, on each flat side, two openings 8 for receiving the stub shafts which are coupled, in these openings, to the tape reels disposed in the cartridge. Each flat side of the cartridge is also provided with an elongated inspection opening through which the tape coils can be observed. FIG. 1 illustrates an intermediate position which is assumed during operation of the tape and in which both tape coils 9 and 9a can be seen in the inspection opening.

In a cartridge tape recorder, reproducer or recorder-reproducer, having a cartridge receiving space which can be closed by a cover and into which the stub shafts for driving the tape coils protrude, the measuring and indicating device of the invention is designed in such a manner that the cover of the cartridge-receiving space has an elongated aperture which extends substantially along the line connecting the stub shafts, and the pointer having the reading mark is guided for movement parallel to this aperture.

When the cover is closed, the tape coils can be observed without difficulty through the aperture and through the inspection opening of the cartridge, with which the aperture is aligned. When a predetermined tape portion is to be noted, the pointer is manually adjusted so that it is tangential to one of the two tape coils, preferably always to the same tape coil. This enables a reading of a certain value on the scale, which is associated with the pointer. The reading is noted for the cartridge, which is then inserted into the cartridge-receiving space. To enable a predetermined tape portion in a given cartridge to be subsequently found, all that needs to be done is to adjust the pointer to the noted position and to move the tape, without playback of the record, until the periphery of the tape coil is tangential to the pointer.

The invention is capable of several modifications, which are illustrated best by examples described hereinafter. In the simplest embodiment of the invention, the pointer is mounted on the slider which is guided by the longitudinal sides of the aperture in the cover, and a scale cooperable with the pointer is provided on one or both of these longitudinal sides. This arrangement obviously has only a low resolving power, or relatively large scale divisions, so that it is capable of providing only a coarse localization of predetermined tape portions. In another embodiment of the invention, the pointer is connected by a speed-increasing transmission to an indicating device comprising another pointer and an associated scale.

The general design of the invention indicating and measuring device will be understood best by first referring to FIGS. 5 through 7. FIG. 5 shows a portion of a tape coil 16 which may be placed, in the usual manner, on a driven disk, or which may be wound on a flanged reel. To enable application of the invention, such a reel must either consist of transparent material or have apertures arranged so that the tape coil, or sectors thereof, can be observed throughout its radial thickness.

A slider 17 is slidable longitudinally along a radius of the tape coil, although it is not essential that the sliding direction coincide exactly with the radius. Slider 17 has a cross-line mark 18. To save material, the slider has a narrower end portion 20 which is provided with a straight rack 19. A graduated disk 21 has associated therewith a pointer 22 and carries a pinion 23 meshing with the rack 19 and fixed to the disk 21. If mark 18 of slider 17 is adjusted to a certain convolution or turn of coil 16, a certain indication can be read from the graduated disk and can be noted to facilitate the subsequent finding of the same portion or convolution of the tape coil. The graduations of scale 21a may represent length units of the tape on the coil, so that the length of the tape which has been unwound can be read from scale 21a. This design of the scale will not in any way hinder the determination of certain convolutions of the tape.

As a modification of the design shown in FIG. 5, the geared drive between the slider and the disk 21 may be replaced by a chord or belt drive. In such case, pinion 23 would be replaced by a chord or belt pulley, and a chord or belt would be passed around the pulley and secured to the slider. An elastic restoring means would have to be connected to the graduated disk 21 or else the chord or belt must be endless and extend around a return roller.

Graduated disk 21 could be replaced by a swingable pointer movable over a fixed scale. The mark on slider 17 may be in the form of an arrow or the like. Slider 17 preferably is comprised of transparent material, but it may be non-transparent and have a suitable aperture with a cross-line for observing the tape coil or reel.

FIGS. 6a and 6b show, in plan and vertical longitudinal section, a preferred design of the mark of the slider. Slider 17' is formed of two vertically spaced and parallel transparent elements 17a and 17b, and is disposed over a tape coil 16. The reading mark is formed by two substantially longitudinally aligned lines 24 and 25. The line 24 is disposed on the under surface of transparent element 17a and line 25 is disposed on the upper surface of transparent elements 17b. The lines 24 and 25 are so positioned that their adjacent ends are superimposed. The desired tape convolution is sighted in a manner such that the convolution coincides with the adjacent ends of the two lines, so that a parallax-free reading can be obtained.

FIG. 7 illustrates a modified form of slider 17" which is provided with a magnifier for making the reading. Slider 17" comprises a pair of vertically spaced transparent elements 17c and 17d. In the illustrated embodiment, the magnifier consists of two plano-convex lenses 26 and 27, of which the lens 26 has its convex surface facing the tape coil and preferably is integral with the transparent slider part 17d. This lens 26 is designed to form an image of the tape coil. This image is magnified and is presented to the observer's eye by the lens 27. The mark 24 on the under surface of the slider part 17c is disposed in the image plane of lens 26, so that a sharp image of the tape coil and of the mark 24 is obtained.

In accordance with the invention, illuminating means, such as incandescent lamps, may be provided in association with the measuring and indicating device, or a mirror may be provided on that side of the tape coil remote from the reading pointer. Both means may be employed for an improved reading.

The indicating and measuring means of the invention is eminently suitable for incorporation into existing tape recorders, reproducers, or recorder-reproducers, and may be designed as a unit which is to be built in. The graduated disk and the slider may be mounted on a base plate, which is provided or formed with an aperture adjacent to the mark on the slider. If this base plate is provided with mounting means, it may be mounted in a suitable position on an existing tape recorder, reproducer, or recorder-reproducer, requiring only securing means and a bore or aperture through which the mark on the slider is exposed.

The combination or building in of the measuring and indicating device of the invention with a cartridge tape recorder, of the kind shown in FIG. 1, will now be described with reference to the remaining figures of the drawings. In this description, reference will be made to embodiments which may be provided independently of the mode in which the device is used.

Figure 2:
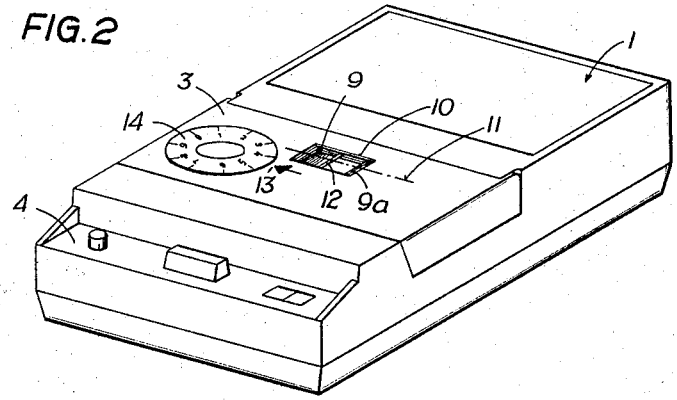
FIG. 2 is a diagrammatic view of the tape recorder shown in FIG. 1 modified to incorporate one embodiment of the measuring and indicating device of the present invention.

FIG. 2 illustrates the invention as embodied in the tape recorder shown in FIG. 1. Cover 3 is formed with an elongated rectangular aperture 10, which has a longitudinal axis 11 indicated by a dash and dot line. Axis 11 crosses the two sub shafts, which are not shown in FIG. 2. A pointer 12 is mounted in aperture 10 for sliding movement therealong, and cover 3 is provided with a reading mark associated with a graduated disk 14. As mentioned, a transmission is provided between pointer 12 and disk 14, and is described more fully hereinafter. By manipulation of graduated disk 14, pointer 12 can be adjusted relative to tap coil 9, for example, to a predetermined point of the aperture 10. This setting can be read from the scale of disk 14, for example, as setting "45."

Alternatively, the arrangement may be designed in such a manner that graduated disk 14 is omitted and pointer 12 is provided on a slider, which has not been shown, which is guided between the longitudinal edges of aperture 10. The associated scale is disposed on the cover and extends along either or both the longitudinal edges of aperture 10.

Figure 3:
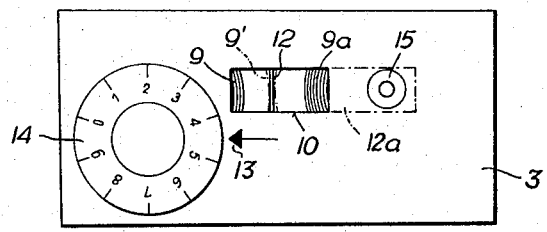
FIG. 3 is a partial plan view of the tape recorder shown in FIG. 2.

FIG. 3 shows a condition of operation in which pointer 12 has been moved to a point along aperture 10 corresponding to "45" on the graduated disk 14. It may be assumed that this point corresponds to a previously noted portion of the tape. The tape is now wound from coil 9a onto coil 9 until the tape on coil 9 is tangential to pointer 12 in the condition indicated at 9'. The tape recorder has now been adjusted to the desired tape portion, which can then be played back or reproduced.

FIG. 3 further illustrates, in dash and dotted lines, an extension 12a of aperture 10 beyond stub shaft 15. As indicated in FIGS. 4a to 4c, the end faces of the stub shafts are provided, in this case, with conspicuous marks, such as crosses, radial lines, and circles, which may have contrasting colors. This design provides for observation of the motion of the tape recorder, and aperture 10 may be sufficiently large that it exposes marks provided on the cartridge.

Figure 8:
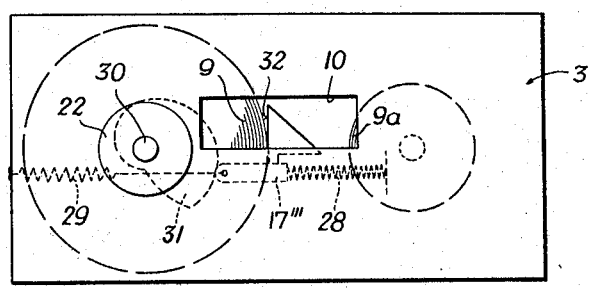
FIG. 8 is a plan view illustrating another form of transmission means used with the invention.

The pointer may be connected to the indicator by a transmission other than that shown in FIG. 5. In FIG. 8, a graduated disk 22 is secured to a shaft 30 to which is also secured an eccentric disk or cam 31. A slider 17''' is biased to bear against the periphery of disk or cam 31, as by means of a compression spring 28 or a tension spring 29. Slider 17''' carries a pointer 32 having a lateral lug. The operation of this transmission will be readily apparent without detailed description. The lug of pointer 32 serves to indicate that the pointer should be moved from the right into registry with the left hand tape coil, so that notations on a uniform basis will be taken during use of the tape recorder and there will be no doubt as to which of the two tape coils the notions are applicable.

Figure 9:
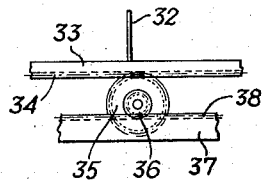
FIG. 9 is a partial elevation view of still another form of transmission means interconnecting a reading pointer and an indicating device in accordance with the invention.
Figure 10:
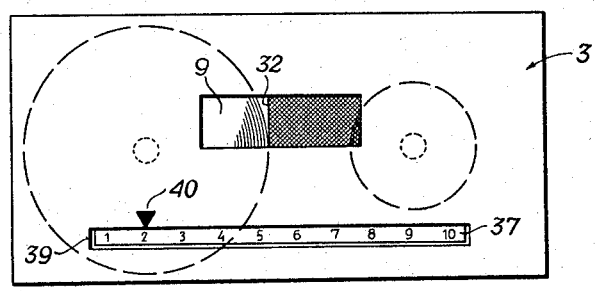
FIG. 10 is a plan view of a cover for a cartridge tape recorder incorporating the mechanism shown in FIG. 9.

FIGS. 9 and 10 illustrate a further embodiment of a transmission in which a slider 33 is provided with a pointer 32 and a straight rack 34 meshing with a relatively large diameter pinion 35. Pinion 35 has secured thereto coaxially a second, and smaller diameter, pinion 36 meshing with the rack 38 of a second slider 37. It will be understood that a displacement of slider 33 in one direction will result in a smaller displacement of slider 37 in the opposite direction. As will be clear from FIG. 10, pointer 32 adjacent tape coil 9 is visible through the aperture in the cover. Slider 37 carries a scale which is visible through an aperture 39 in the cover, and cooperates with a mark 40.

It is assumed, in FIG. 10, that pointer 32 comprises a line mark on a transparent plate, which may be a portion of slider 33. Instead of the pointer having a lug, as in FIG. 8, that surface area of the transparent plate which is on the right side of the pointer mark contrasts with the surface area on the left side of the pointer mark. This is shown in FIG. 11b.

Figure 11A:
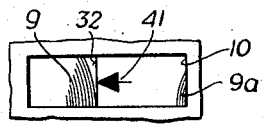
FIGS. 11a, 11b, and 11c are partial plan views of modified forms of reading pointers embodying the invention.
Figure 11B:
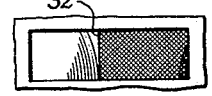
Figure 11C:
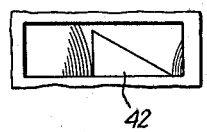

FIG. 11a shows an arrow 41 arranged alongside the pointer mark and directed to the line 32. FIG. 11c illustrates a triangular colored or engraved mark 42 on the surface of the slider. In the same manner as with a pointer having a lug, the markings 11a, 11b and 11c assure a uniform reading.

What is claimed is:

1. Means for indicating a predetermined portion of a tape coil, said means comprising, in combination, a pointer guide arranged to intersect the periphery of a tape coil and extending in a plane which is substantially normal to the axis of said tape coil; a manually operable reading pointer mounted on said pointer guide for movement therealong free of contact with said tape coil; a reading mark on said reading pointer arranged to be moved by said reading pointer into axial registry with the periphery of said tape coil; an indicating device for indicating the position of said reading pointer; and a transmission interconnecting said reading pointer and said indicating device.

2. Means for indicating a predetermined portion of a tape coil, as claimed in claim 1, in which said indicating device includes a scale and an indicating pointer cooperable with said scale; said reading pointer comprising a slider; said transmission being a speed-changing transmission.

3. Means for indicating a predetermined portion of a tape coil, as claimed in claim 2, in which said transmission includes a rack on said slider meshing with a pinion coupled to said indicating device.

4. Means for indicating a predetermined portion of a tape coil, as claimed in claim 2, in which said transmission comprises a flexible element coupling said slider to said indicating device.

5. Means for indicating a predetermined portion of a tape coil, as claimed in claim 2, in which said transmission includes a first rack on said slider, a first pinion meshing with said first rack and rotatable on a stationary axis, a second pinion coaxial with said first pinion and rotatable therewith and a second rack on said indicating device meshing with said second pinion.

6. Means for indicating a predetermined portion of a tape coil, as claimed in claim 1, in which said indicating device comprises a scale and an indicating pointer cooperable with said scale; said transmission comprising a manually operable cam coupled to said indicating device; said reading pointer comprising a slider; and spring means biasing said slider into engagement with said cam.

7. Means for indicating a predetermined portion of a tape coil, as claimed in claim 1, said reading pointer being formed of transparent material and said reading mark comprising two lines, which are substantially aligned longitudinally with each other and are respectively disposed on upper and lower surfaces of said reading pointer, said lines having their adjacent ends in vertical registry.

8. Means for indicating a predetermined portion of a tape coil, as claimed in claim 1, in which said reading pointer includes image magnifying means operatively associated with said reading mark.

9. Means for indicating a predetermined portion of a tape coil, as claimed in claim 8, in which said reading pointer comprises a slider; said magnifying means comprising two plano-convex lenses disposed on opposite surfaces of said slider.

10. Tape-winding apparatus comprising, in combination, a housing; first tape-winding means mounted in said housing and arranged to carry a first tape coil; second tape-winding means mounted in said housing and arranged to carry a second tape coil; driving means in said housing for said tape-winding means; an indicating means on said housing for indicating a predetermined portion of a tape coil on one of said tape winding means, said indicating means including a pointer guide intersecting the periphery of a tape coil on one of said tape-winding means and in a plane substantially normal to the axis of said tape coil on said one tape-winding means; a manually operable reading pointer mounted on said pointer guide for movement therealong free of contact with a tape coil on said tape-winding means, a reading mark on said pointer arranged to be moved by said pointer into axial registry with the periphery of a tape coil on said one tape-winding means, an indicating device for indicating the position of said reading pointer, and a transmission interconnecting said pointer and said indicating device.

11. Tape-winding apparatus, as claimed in claim 10, in which said housing is formed with a cartridge-receiving space to receive a tape cartridge containing two interconnected tape coils for coupling thereof to said tape-winding means; said tape-winding means comprising respective stub shafts extending into said cartridge-receiving space for operative engagement with the tape coils in said cartridge; and a cover selectively positionable to close said cartridge-receiving space; said cover having an elongated aperture therein extending substantially along a straight line intersecting said stub shafts; said pointer guide extending parallel to said aperture.

12. Tape-winding apparatus, as claimed in claim 11, in which said reading pointer is a slider; said pointer guide defining longitudinal side edges of said aperture; said indicating device including graduations extending along at least one of said longitudinal side edges.

13. Tape-winding apparatus, as claimed in claim 11, in which said indicating device is mounted on said cover and includes a scale and an indicating pointer cooperable with said scale; said transmission being a speed-changing transmission.

14. Tape-winding apparatus, as claimed in claim 11, in which said aperture has a length sufficient to expose said stub shafts.

15. Tape-winding apparatus, as claimed in claim 14, in which said aperture exposes marks on a cartridge positioned in said cartridge-receiving space.

16. Tape-winding apparatus, as claimed in claim 14, including distinctive markings on the exposed end faces of said stub shafts.

17. Tape-winding apparatus, as claimed in claim 10, in which said indicating means includes illuminating means disposed adjacent that surface of a tape coil on said one tape-winding means which is remote from said reading mark.

18. Tape-winding apparatus, as claimed in claim 10, in which said indicating means includes a mirror disposed on said surface of a tape coil on said one tape-winding means which is remote from said reading mark.

19. Tape-winding apparatus, as claimed in claim 10, in which said reading pointer comprises a slider; said slider having visually different surface portions on radially opposite sides of said reading mark.

References Cited

UNITED STATES PATENTS

| | | | |
|---|---|---|---|
| 2,612,565 | 9/1952 | Heller | 242—57 X |
| 2,937,818 | 5/1960 | Zorn | 242—55.13 |
| 3,133,711 | 5/1964 | Jager | 242—55.12 |
| 3,414,269 | 12/1968 | Appel | 242—55.13 X |

LEONARD D. CHRISTIAN, Primary Examiner

U.S. Cl. X.R.

33—126.5; 242—201, 206